(12) United States Patent
Brenneman et al.

(10) Patent No.: US 7,833,292 B2
(45) Date of Patent: Nov. 16, 2010

(54) CHANNEL METHOD FOR FORMING A CAPACITOR

(75) Inventors: Keith R. Brenneman, Simpsonville, SC (US); Chris Wayne, Moore, SC (US); Chris Stolarski, Greenville, SC (US); John T Kinard, Greer, SC (US); Alethia Melody, Greenville, SC (US); Gregory J. Dunn, Arlington Heights, IL (US); Remy J. Chelini, Crystal Lake, IL (US); Robert T. Croswell, Elgin, IL (US)

(73) Assignee: KEMET Electronics Corporation, Greenville, SC (US)

( * ) Notice: Subject to any disclaimer, the term of this patent is extended or adjusted under 35 U.S.C. 154(b) by 271 days.

(21) Appl. No.: 12/098,593

(22) Filed: Apr. 7, 2008

(65) Prior Publication Data

US 2008/0273291 A1    Nov. 6, 2008

Related U.S. Application Data

(60) Provisional application No. 60/927,025, filed on May 1, 2007.

(51) Int. Cl.
*H01G 9/00* (2006.01)

(52) U.S. Cl. .................................................. 29/25.03
(58) Field of Classification Search ................. 29/25.03
See application file for complete search history.

(56) References Cited

U.S. PATENT DOCUMENTS 6,678,927 B1 *   1/2004   Retseptor ................... 29/25.42
2006/0120014 A1   6/2006   Nakamura et al.

* cited by examiner

*Primary Examiner*—Scott B Geyer
*Assistant Examiner*—Seahvosh J Nikmanesh
(74) *Attorney, Agent, or Firm*—Joseph T. Guy; Nexsen Pruet, LLC

(57) ABSTRACT

An improved method for forming a capacitor. The method includes providing a carrier with a channel therein, providing a metal foil with a valve metal with a first dielectric on a first face of the metal foil, securing the metal foil into the channel with the first dielectric away from a channel floor, inserting an insulative material between the metal foil and each side wall of the channel, forming a cathode layer on the first dielectric between the insulative material, forming a conductive layer on the cathode layer and in electrical contact with the carrier, lap cutting the carrier parallel to the metal foil such that the valve metal is exposed, and dice cutting to form singulated capacitors.

76 Claims, 7 Drawing Sheets

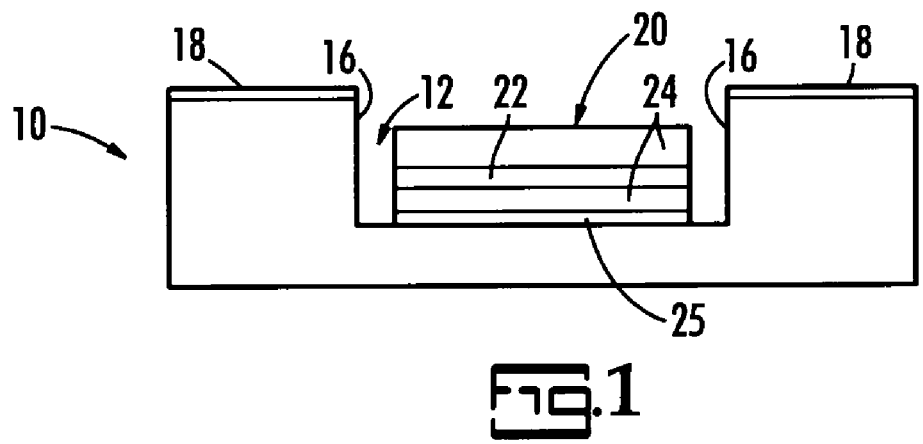
Fig.1
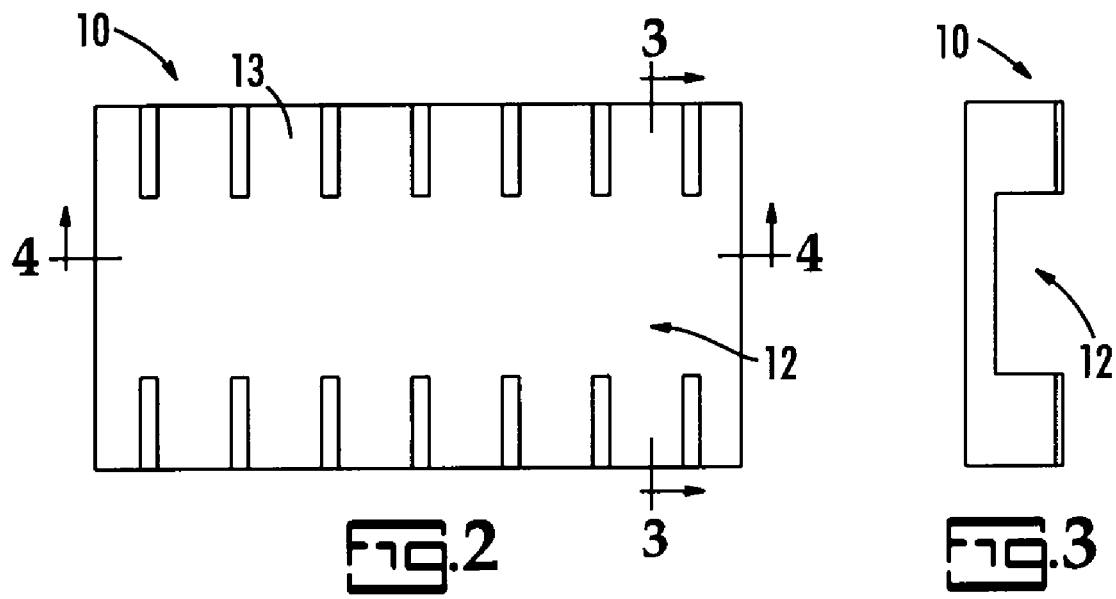
Fig.2
Fig.3
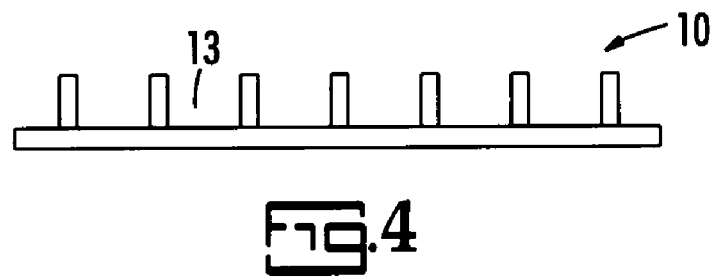
Fig.4

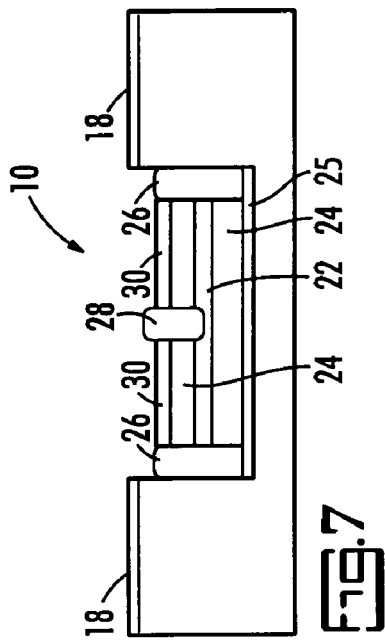
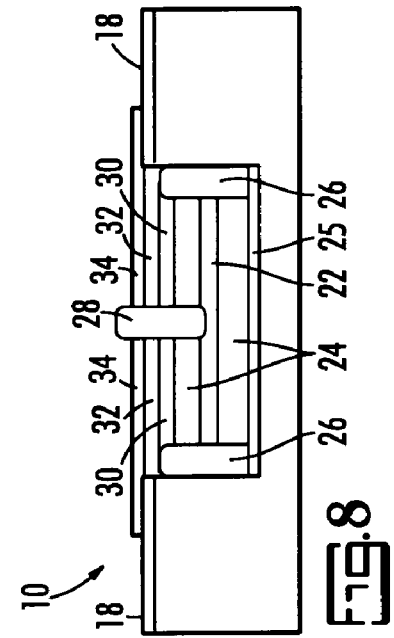
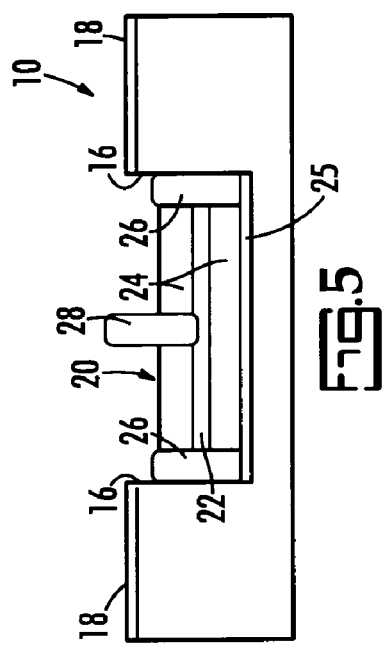
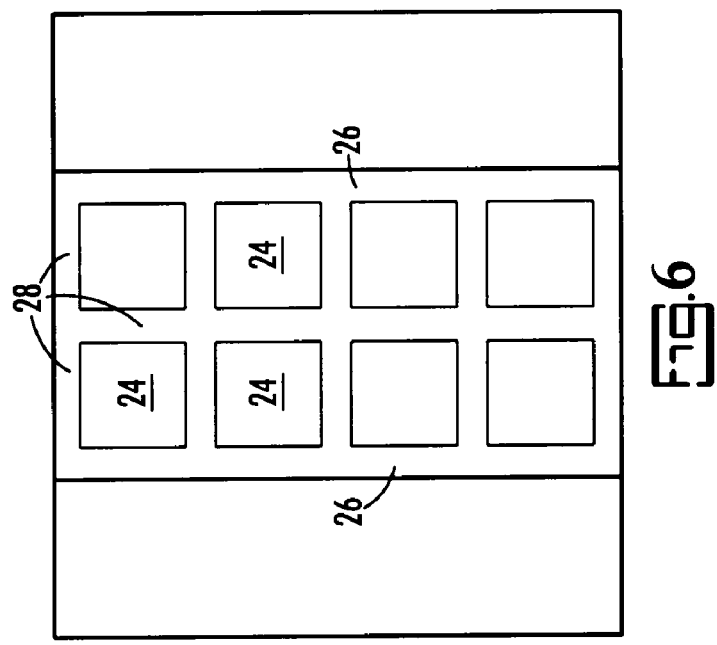

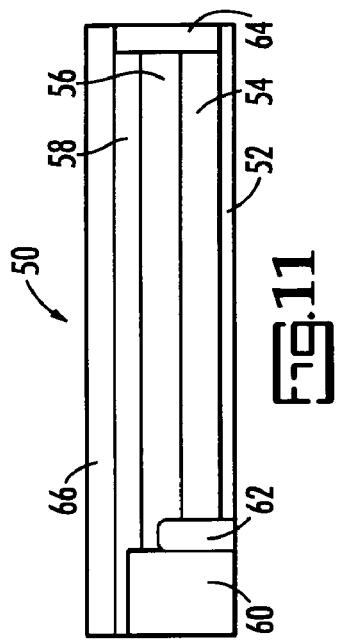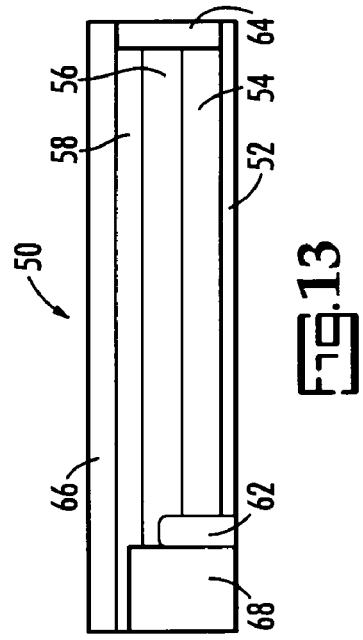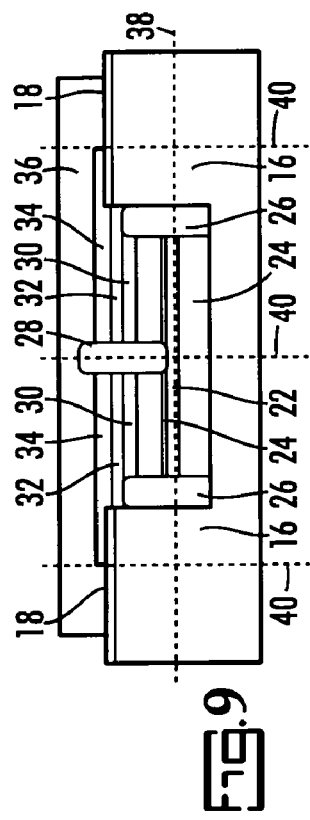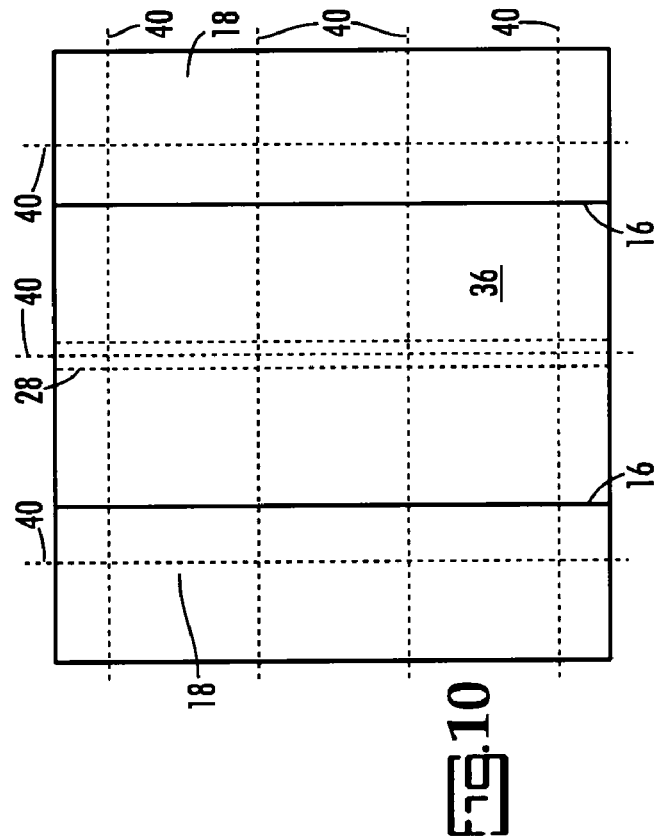

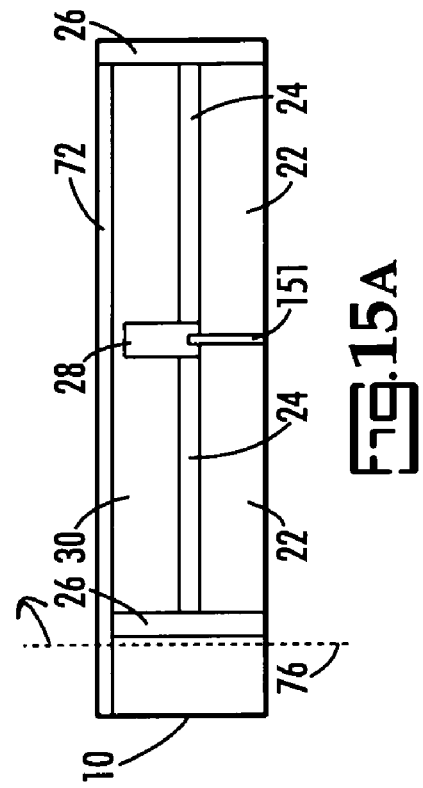
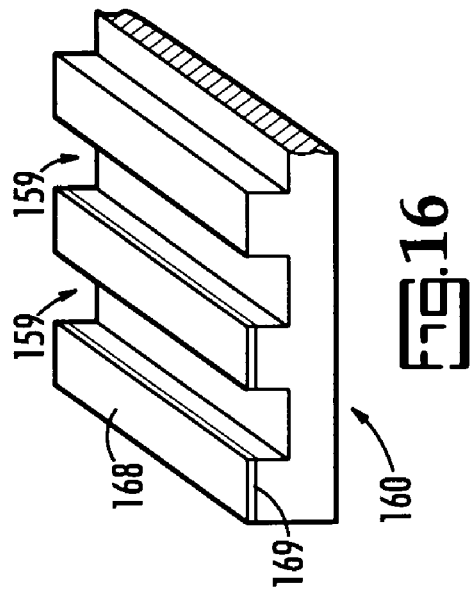
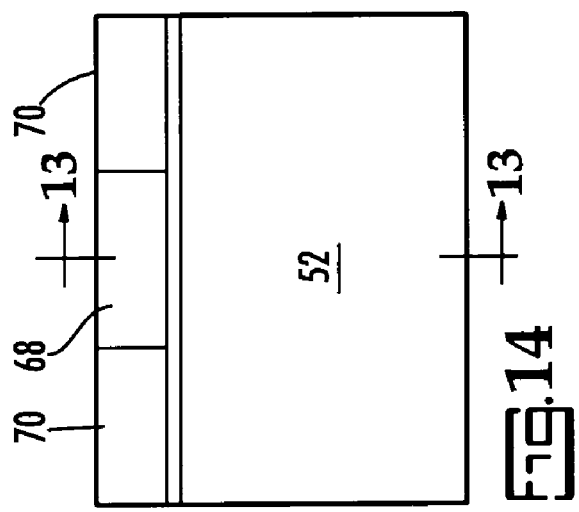
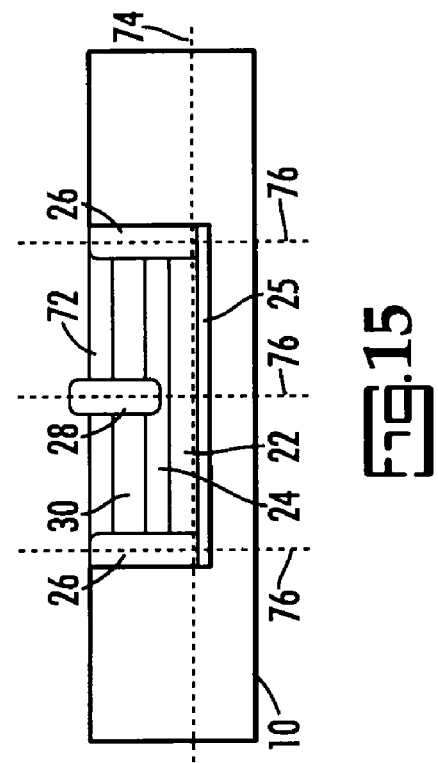

CHANNEL METHOD FOR FORMING A CAPACITOR

CROSS-REFERENCE TO RELATED APPLICATIONS

The present invention claims priority to U.S. Provisional Patent Application No. 60/927,025 filed May 1, 2007 which is pending and incorporated by reference.

BACKGROUND

The present invention is related to an improved method for forming a capacitor. More specifically, the present invention is related to a method for forming a capacitor utilizing a channeled substrate.

Capacitors are utilized in virtually every electronic device. The function in an electronic circuit is well known and further discussion is not warranted herein. The instant disclosure is directed to improvements in the manufacture of sheet-based capacitors.

In one method of manufacture, capacitors are formed from metal sheets wherein the general process includes oxidation, also referred to as anodization, of a metal sheet to form a dielectric. A conductive layer is formed on the dielectric. The capacitor is conventionally utilized in an electrical circuit with the metal sheet functioning as the anode and the conductive layer functioning as the cathode, even though this can be reversed.

Small surface mount capacitors have been successfully formed from aluminum foil. The aluminum foil, either strips or sheets, is etched to increase the surface area and then anodized to form a thin dielectric on each face. A conductive layer, such as a conductive polymer, is then formed on the dielectric. If necessary, the strip is cut into rectangles. The rectangles may be combined in parallel to form a capacitor package. Terminal leads and molding are added to form a surface mountable capacitor.

Manufacturing of foil based capacitors is difficult due to the fragile nature of a thin metal foil. The present invention provides an improved method for thin capacitor formation.

SUMMARY

It is an object of the present invention to provide an improved method for the formation of capacitors.

It is another object of the present invention to provide an improved method for forming a thin capacitor from conductive sheets such as metal foils.

A particular feature of the present invention is a method of manufacturing a thin capacitor from a conductive sheet requiring a minimal amount of handling of the conductive sheet.

Another particular feature of the present invention is the ability to encapsulate and immobilize the conductive sheet during formation of a capacitor from the conductive sheet.

These and other advantages, as will be realized, are provided in a method for forming a capacitor. The method includes:
providing a carrier comprising a channel therein;
providing a conductive foil or sheet, preferably comprising a valve metal, with a first dielectric on a first face of the conductive foil;
securing the conductive foil into the channel with the first dielectric away from a channel floor;
inserting an insulative material between the conductive foil and each side wall of the channel;
forming a cathode layer on the first dielectric;
forming a conductive layer on the cathode layer and in electrical contact with the carrier;
lap cutting the carrier parallel to the conductive foil such that the conductive foil is exposed; and
dice cutting to form singulated capacitors.

Yet another embodiment is provided in a method for forming a capacitor having coplanar terminations. The method includes:
providing a carrier comprising a channel therein;
providing a conductive, preferably metal, foil most preferably comprising a valve metal with a first dielectric on a first face of the conductive foil;
securing the conductive foil in the channel with the first dielectric away from a channel floor;
inserting an insulative material between the conductive foil and each side wall of the channel;
forming a cathode layer on the first dielectric;
forming a conductive layer on the cathode layer and in electrical contact with the carrier;
lap cutting the carrier parallel to the metal foil such that the conductive foil is exposed; and
dice cutting to form singulated capacitors wherein the dice cutting excludes the insulative material such that at least part of the carrier remains attached to the final device.

Yet another embodiment is provided in a method for forming a capacitor having terminals on opposite faces. The method comprises:
providing a carrier comprising a channel therein;
providing a conductive, preferably metal, foil most preferably comprising a valve metal with a first dielectric on a first face of the conductive foil;
securing the conductive foil into the channel with the first dielectric away from a channel floor;
inserting an insulative material between the conductive foil and each side wall of the channel;
forming a cathode layer on the first dielectric;
forming a conductive layer on the cathode layer and in electrical contact with the carrier;
lap cutting the carrier parallel to the conductive foil such that the conductive portion of the conductive foil is exposed; and
dice cutting within the insulative material such that the carrier is removed to form a singulated capacitor.

Yet another embodiment is provided in a capacitor. The capacitor has a metal foil anode with a bottom and top. A dielectric is on the top of the metal foil anode. A cathode is on the dielectric opposite to the metal foil anode. A cathode lead is in electrical contact with the cathode on a first face where a second face of the cathode lead is coplanar with the bottom of the metal foil anode. An insulator is on two opposing sides of the cathode lead different than the first face and second face.

Yet another embodiment is provided in a capacitor. The capacitor has a conductive foil anode with a bottom and top. A dielectric is on the top of the conductive foil anode. A cathode is on the dielectric opposite to the conductive foil anode. A cathode lead is in electrical contact with the cathode on a first face where a second face of the cathode lead is coplanar with the bottom of the conductive foil anode. An insulator is on two opposing sides of the cathode lead different than the first face and second face.

Yet another embodiment is provided in a capacitor with a metal foil anode having a bottom and top. A dielectric is on the top of the metal foil anode. A cathode lead is circumjacent to the metal foil anode. A cathode lead is in electrical contact with the cathode; and an insulator is between the cathode lead and the metal foil anode.

Yet another embodiment of the present invention is provided in a method for forming a capacitor. The method includes:

providing a metal foil with a first edge and a dielectric on a first face;

applying an insulator to the first edge and to a second face of the metal foil opposite to the dielectric;

applying a conductive layer to the dielectric and the insulator;

attaching a metal strip to the conductive layer to form a capacitor precursor;

lap cutting the capacitor precursor parallel to the foil and through the foil and the metal strip thereby exposing the metal strip and the metal foil on a common face with an insulator therebetween.

BRIEF DESCRIPTION OF FIGURES

FIG. 1 is a schematic cross-sectional side view of a conductive foil in a carrier in accordance with the instant invention.

FIGS. 2, 3 and 4 are various schematic views of a carrier with cross-cut channels.

FIG. 5 is a schematic cross-sectional view of the embodiment of FIG. 1 after further processing.

FIG. 6 is a top schematic view of the embodiment of FIG. 5.

FIG. 7 is a schematic cross-sectional view of the embodiment of FIG. 5 after further processing.

FIG. 8 is a schematic cross-sectional view of the embodiment of FIG. 7 after further processing.

FIG. 9 is a schematic cross-sectional view of the embodiment of FIG. 8 illustrating lap and dice lines.

FIG. 10 is a top schematic view illustrating the dice lines.

FIG. 11 is a schematic cross-sectional view of an embodiment of a finished capacitor of the present invention.

FIG. 12 is a schematic bottom view of the finished capacitor illustrated in FIG. 11.

FIG. 13 is a schematic cross-sectional view of an embodiment of a finished capacitor of the present invention.

FIG. 14 is a schematic bottom view of the finished capacitor illustrated in FIG. 13.

FIG. 15 is a schematic cross-sectional view of an embodiment the present invention illustrating lap and dice lines.

FIG. 15a illustrates an alternative embodiment of the present invention.

FIG. 16 is a schematic perspective view of a carrier of the present invention.

DETAILED DESCRIPTION OF THE INVENTION

Figure 17:
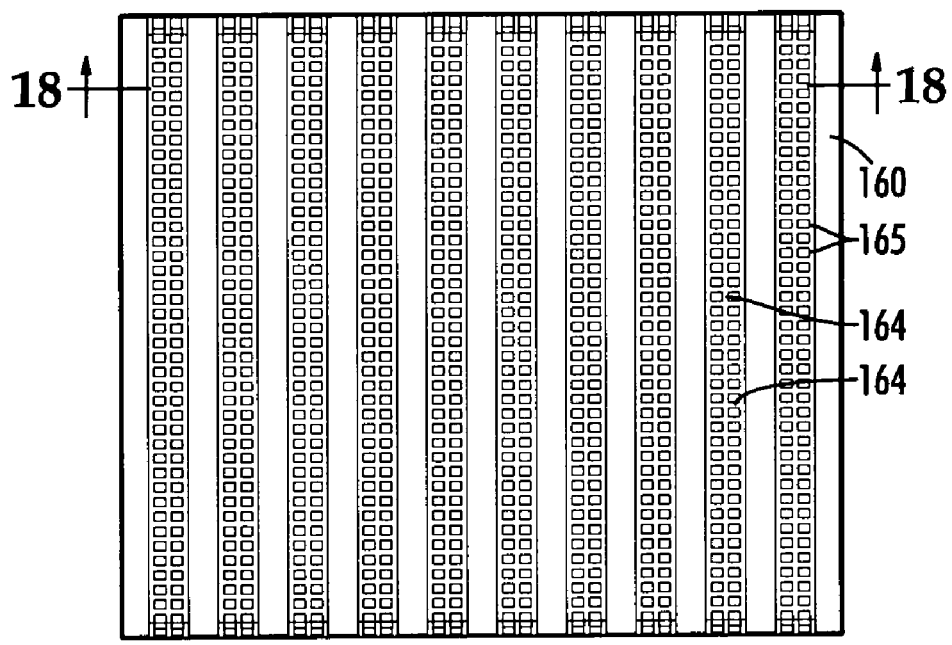
FIG. 17 is a top view of an embodiment of the present invention.

The invention will be described with reference to the various figures forming an integral non-limiting part of the disclosure. In the various figures similar elements will be numbered accordingly.

Described is a process for forming a capacitor utilizing a channel in a carrier strip followed by lap and dice cutting to form discrete capacitors.

A capacitor is generally understood to comprise two parallel conductors with a dielectric therebetween. For the purposes of the present invention neither the composition of the conductors nor that of the dielectric is particularly limited. By convention the anode is the positive terminal and the cathode is the negative terminal, though some capacitor designs can be used without consideration of orientation within the circuit. For the purposes of the present invention a conductive foil will be defined as the anode and the cathode is formed during exercise of the invention. It is to be understood that this nomenclature is for convenience of discussion without necessarily limiting the manner in which the capacitor is used within a circuit unless stated otherwise.

A channel carrier is illustrated schematically in FIG. 1. In FIG. 1, the carrier, generally represented at 10, is a solid, conductive, preferably metal, carrier strip having a channel, 12, with at least one side wall which is preferably centrally located. The channel width is preferably slightly more than the conductive foil, 20, resident therein. The conductive foil is typically slightly more than twice the width required for a finished capacitor. The channel is preferably milled with a flat floor most preferably with height variations along the surface of the channel of no more than 0.0025 mm. At least one channel side wall which is substantially perpendicular to the channel floor is preferred. It is most preferred that the channel have two side walls.

The channel sidewalls, 16, may be cross-cut, 13, as illustrated schematically in FIGS. 2 through 4, which are at an angle relative to the channel with perpendicular being most preferred. The cross-cutting increases structural integrity of the final device by lending physical support to the later applied encapsulant which will be further described herein. The shape of the cross-cut is not particularly limiting and includes rectangular, diverging away from the bottom, or "T"-shaped.

The top surface of the carrier, 10, may have a conductive, preferably metal, layer, 18, coated thereon wherein the conductive layer is preferably selected from nickel, tin, copper, palladium, gold, lead, a combination thereof, or a combination of at least one of these metals with an additional metal which is resistive to oxidation. The conductive layer of the top surface may be applied by any method known in the art, including plating, sputtering, or other methods wherein a thin layer of deposition is prepared. The conductive layer forms an oxidation-resistant electrical connection between the carrier strip and the cathode of the eventual capacitor and prevents increases in resistance when the assembled capacitor is exposed to moisture.

A strip of conductive foil, 20, is centered inside the channel of the carrier and preferably adhered to the channel floor using an adhesive, 25, preferably a low-viscosity adhesive. A particularly preferred adhesive is a polyimide. For the purposes of the present invention, the terms "foil" and "sheet" are used interchangeably. The conductive foil comprises a conductive layer, 22, which ultimately forms the anode, and is preferably a valve metal, preferably aluminum, tantalum, niobium or titanium, a conductive metal oxide such as NbO, or a combination thereof, or conductive polymeric material. A dielectric layer, 24, is formed on at least the surface which is away from the adhesive, 25. The dielectric is preferably an oxide of the anode material. It is preferable to have only one dielectric layer since the dielectric layer facing the adhesive will be sacrificed during manufacture. Metal foil with a single oxide layer is not commercially available under favorable terms, thereby necessitating the use of a foil with both sides oxidized. It is preferred that the surface of the anode is roughened to increase the surface area prior to anodizing to form the oxide dielectric.

The strip of conductive foil is preferably slightly wider than twice the width of the foil required in the finished product. It is important that no physical or electrical contact be made between the strip of conductive foil and the channel side walls. The strip of conductive foil is preferably approximately centered. The depth of the channel should be no less than the thickness of the conductive foil such that the final cathode layer may establish electrical connection with the carrier without contacting the edges of the foil.

As illustrated schematically in FIGS. 5 and 6, an insulative material, 26, is applied to the side walls of the carrier, filling the gap between the carrier and the conductive foil. It would be apparent that the insulative material is electrically insulating otherwise high leakage current would be realized in the final product. The insulative material is preferably a polymer solution having a viscosity which is high enough to prevent bleeding onto the foil strip as this would reduce the available functional capacitance area. The viscosity of the polymer solution is preferably low enough that the material can penetrate into the roughened surface of the valve metal.

A singulation dam, 28, is formed to pattern discrete capacitor elements. The singulation dam is preferable formed from a high viscosity, electrically insulating polymeric material. The viscosity is similar to that of the insulative material. The singulation dam is applied by any method known in the art for printing a polymeric layer including screen printing or direct application methods such as by syringe, by brush or by a transfer wheel. The singulation dam and insulative material insure that the later applied cathode layer does not contact the cut edges of the foil which would cause electrical shorts during subsequent singulation.

In an alternative embodiment, a conductive foil with a dielectric thereon and a conductive layer on the dielectric may be prepared as a layered structure and the layered structure inserted into the channel. The singulation dam may be excluded or applied to the layered structure prior to inserting the layered structure into the channel. After the layered structure is inserted into the channel, the insulation material is then added.

As illustrated schematically in FIG. 7, a cathode layer, 30, is formed on the exposed dielectric layer, 24. The cathode layer is a solid electrolyte. The solid electrolyte layer may consist of one or more layers of one or more conductive polymers. Preferred conductive polymers include polypyrrole, polyaniline and polythiophene. The conductive polymer may be applied from a solution or suspension or the conductive polymer may be formed in-situ by coating a monomer and oxidizer sequentially. In-situ formation is less preferred due to the complexities of incorporating the process into conventional in-line automated processes since the number of process steps is necessarily increased with in-situ formation. Furthermore, in-situ polymer formation typically provides a thicker, less dense, polymer layer which is less desirable in most applications. The polymer layer is applied by any technique available in the art, without limit, with exemplary methods including ink jet printing, screen printing, gravure coating or masked spraying. The cathode layer may comprise a manganese dioxide layer either in addition to a polymer layer or instead of the polymer layer. The manganese dioxide layer is preferably formed by applying a solution of a manganese compound, such as manganese nitrate or a permanganate, followed by converting the manganese compound to manganese dioxide by heat. It is preferable that the manganese dioxide layer be deposited prior to deposition of the polymer; however, they can be added as a mixture.

As illustrated schematically in FIG. 8, a carbon layer, 32, is preferably applied over the cathode layer. The carbon layer improves adhesion between the solid electrolyte cathode layer, 30, and subsequent conductive layer, 34, and is therefore preferred. The carbon layer is formed on the patterned surface of the solid electrolyte layer by applying a paste, or thick ink, containing carbon particles preferably in the form of graphite or carbon black. The carbon layer can be applied by ink jet printing, screen printing, gravure printing or by spraying without limit thereto. It is also desirable to apply a solder layer over the carbon layer; however, the subsequent conductive layer may render the solder layer unnecessary. The solder layer, if applied, can be in the form of a solder paste or a conductive paste. The solder layer is added as a coating on top of the conductive layer. The solder layer facilitates connection of a surface mountable device.

A conductive layer, 34, is added to form electrical conductivity between the cathode layers and the conductive layer, 18. The conductive layer may be a silver, copper, gold, or other highly conductive metal or combinations thereof. Particularly preferred is a silver, copper or silver/copper ink or paste. The layer may be deposited by ink jet printing, screen printing, gravure printing, spraying, sputtering, atomic layer deposition or other means for applying a thin layer deposition.

After formation of the capacitive layers, a protective layer or encapsulant, 36, is formed on at least a portion of the carrier strip as illustrated in schematic side view in FIG. 9 and schematic top view in FIG. 10. The encapsulant is preferably an insulating polymer which, when cured, provides some rigidity and resistance to mechanical wear during end-of-line processes and customer use as typically employed in capacitors. Preferred materials, not limited thereto, include resins, polyimides, epoxies, glass-filled epoxies, silicones and the like.

After encapsulation, a multiplicity of capacitors is contained within the carrier. For use, it is preferable to separate the discrete capacitors from the carrier. The anode which is the conductive foil, 22, is exposed by removing those portions below the plane defined by the lap line, 38, of FIG. 9. It would be apparent that the removal of the carrier and dielectric, if present, exposes the conductive foil which acts as the anode. In practice, a small portion of the anode is removed to insure a clean surface of anode material; however, the amount of anode removed is preferably minimized due to cost and time considerations. The capacitors can then be separated, or singulated, by cutting along dice lines, 40. Six discrete capacitors are illustrated in FIG. 10 without limit thereto. In one embodiment, adjacent units can remain together thereby forming a capacitor with two distinct cathodes and a common anode. The number of capacitors formed in this manner can be very large. It would be apparent that the number of capacitors formed per carrier is a function of the size limitations of the manufacturing equipment and efficiencies and is not limited by the inventive process.

Lap cutting, as used herein, refers to a cutting operation which makes the anode accessible and is typically substantially parallel to the anode and refers to any mechanical means of forming a cut which is substantially parallel to the anode face. Exemplary methods include planing, lapping, sand blasting, single point diamond turning, grinding, routing and the like. In the present invention, it is most desirable to lap cut the entire carrier. However, discrete regions can be lap cut such that the discard areas between capacitors are not cut.

Dice cutting, as used herein, refers to a cutting operation which separates discrete capacitors from the carrier or from each other and is not parallel to the anode and is preferably substantially perpendicular to the anode. Exemplary methods include saw dicing, blade dicing, water jet cutting, laser cutting and the like.

It is preferable to expose the anode prior to dice cutting. However, dice cutting can be done first and then the individual capacitors lap cut to expose the anode.

After lap and dice cutting discrete capacitors are provided with the remaining carrier forming the cathode connection and the exposed metal of the metal foil forming the anode connection based on conventional terminology.

An embodiment of a finished capacitor is illustrated in cross-sectional schematic view in FIG. 11 and in schematic bottom view in FIG. 12. The capacitor, generally represented at 50, comprises an anode, 52, which is the exposed conductive foil. The dielectric, 54, separates the cathode, 56, from the anode. The cathode may include multiple layers if necessary or it may be a single conductive layer. A conductive layer, 58, electrically connects the cathode to a cathode lead, 60, which is that portion of the carrier remaining after lap and dice cutting. Primary insulative material, 62, separates the anode and cathode and secondary insulative material, 64, insulates the edge of the anode. An encapsulant, 66, electrically isolates the upper side if this side is not intended to be subsequently connected to a circuit trace.

Another embodiment of a finished capacitor is illustrated in schematic cross-sectional view in FIG. 13 and schematic bottom view in FIG. 14. In the embodiment of FIGS. 13 and 14 the carrier was originally crosscut as described above. In the finished capacitor the cathode lead out, 68, does not extend the entire width of the capacitor but is instead sandwiched between insulative islands, 70.

Another embodiment is illustrated in schematic cross-sectional view in FIG. 15. In FIG. 15, the anode, 22, is oxidized on a single side wherein the oxide forms the dielectric, 24. A solid cathode layer is illustrated at 30 with discrete areas separated by singulation dams, 28. A conductive layer, 72, is in electrical contact with the cathode. The conductive layer allows adequate adhesion between the eventual capacitor and the circuit trace and is desirable due to the difficulty in forming an electrical connection directly with a solid cathode layer. There is preferably no encapsulating layer, or a limited area encapsulation, in this embodiment. The lap line, 74, is coplanar with the lower extent of the anode. If necessary, the lap line may be slightly interior to the anode thereby sacrificing a small portion of the anode to insure a clean surface. The dice lines, 76, separate the discrete capacitors within the insulative material, 26, and singulation dam, 28. After dicing and lapping, in either order, discrete capacitors are obtained with opposing polarity on opposite faces.

Another embodiment is illustrated in cross-sectional side view in FIG. 15a as a modification of the embodiment of FIG. 15. In FIG. 15a, the singulation dam, 28, is lower than the top layer cathode layer such that the cathode, 30, is in electrical contact either by the cathode layer, 30, being at least partially continuous, or by the conductive layer, 72, being in electrical contact with both cathode layers. Alternatively, the singulation dam can be eliminated. A kerf, 151, separates the anode into two distinct elements thereby forming a capacitor with a common cathode and individual anodes. The capacitor can be singulated by cutting at the dice line, 76, to form a non-polar device or a portion of the carrier can remain to form a capacitor with coplanar terminations. If a face down capacitor is desired at least the conductive layer, 72, preferably overlaps the carrier as described elsewhere herein.

The capacitor may be polar or non-polar. Referring to FIG. 15, the finished capacitor will have two conductors separated by a dielectric wherein one conductor is defined as the anode and the other as the cathode. Capacitors having a common anode internal to the device with multiple discrete cathode terminals or a common cathode internal to the device with discrete anode terminals have no preferred orientation in electrical circuitry and therefore are referred to as non-polar. Capacitors having both anode and cathode terminals have a distinct orientation in electrical circuitry and are referred to as polar.

A particular feature of the present invention is the ability to form a capacitor with thin layers which would otherwise be difficult to manufacture. Capacitive elements with a thickness of less than 250 µm, as measured from the cathode face to the opposing anode face, can easily be formed with the present invention. The ability to manufacture a capacitor with thin active layers increases the capacitive volume which is an ongoing desire in capacitor manufacture. The present invention allows for the manufacture of a capacitive couple, being the anode, dielectric and cathode, of about 10 µm to about 250 µm thick. More preferably, the present invention allows for the manufacture of a capacitive couple which is less than 100 µm and more preferably less than 50 µm thick.

A particularly preferred carrier is illustrated in schematic top perspective view in FIG. 16. In FIG. 16, the carrier, generally represented at 160, comprises a multiplicity of channels, 159. A conductive layer, 168, may be on the top surface, 169, of the channel carrier.

Figure 18:
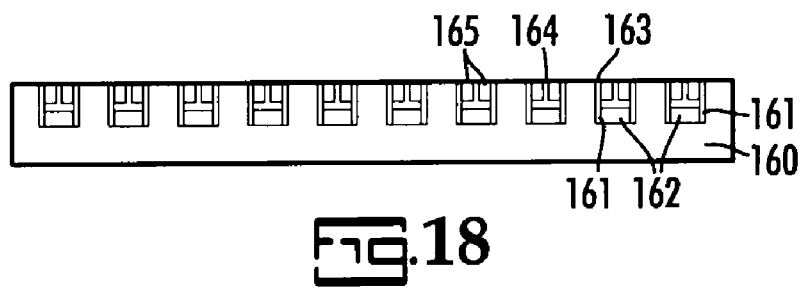
FIG. 18 is a cross-sectional schematic view taken along line 18-18 of FIG. 17.

FIG. 17 illustrates the multi-channel carrier in schematic top view and FIG. 18 illustrates a schematic cross-sectional view taken along line 18-18 of FIG. 17. FIGS. 17 and 18 are prior to singulation. In FIGS. 17 and 18, each channel has an anode, 161, with a dielectric, 162, thereon. An insulative material, 163, separates the anode from the side walls of the channel. Singulation dams, 164, form discrete regions within which the cathode, 165, is formed. As would be realized, the cathode preferably has additional layers such as a carbon layer, a metal layer, and a solder layer to facilitate attachment of the capacitor to an electrical circuit. The capacitors would be singulated as described herein by lap cutting to expose the anode and dice cutting in the insulative material.

Figure 19:
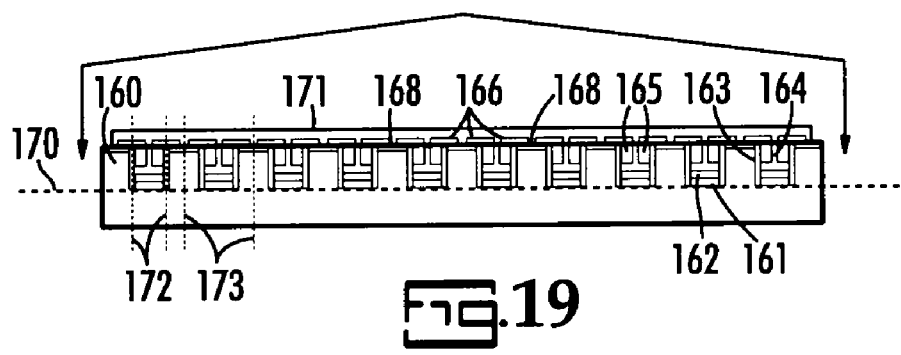
FIG. 19 is a cross-sectional schematic view of an embodiment of the invention.

Another embodiment is illustrated in schematic cross-sectional view in FIG. 19. In FIG. 19, the carrier, 160, has multiple channels. Each channel has therein anodes, 161, dielectrics, 162, insulative materials, 163, singulation dams, 164, and cathodes, 165, as described above. A conductive layer, 166, electrically connects the cathode, 165, to the carrier, 160, preferably through a metal layer, 168. An insulator layer, 171, can be applied to the top surface if desired.

To form discrete capacitors the excess carrier is removed by cutting along the lap line, 170, approximately parallel to the floor of the channel to expose the anode. The capacitors can be singulated by dice cutting along dice lines 172 or along lines 173 depending on the type of capacitor desired. It would be apparent to one of skill in the art that dice cutting along dice line 172 would form a capacitor with the anode and cathode on opposing faces. In this instance it would be desirable to forego the conductive layer and insulator layer otherwise the cathode can be otherwise accessed. If cut along dice lines 173 a capacitor with anode and cathode terminations on a common face is prepared.

Figure 20:
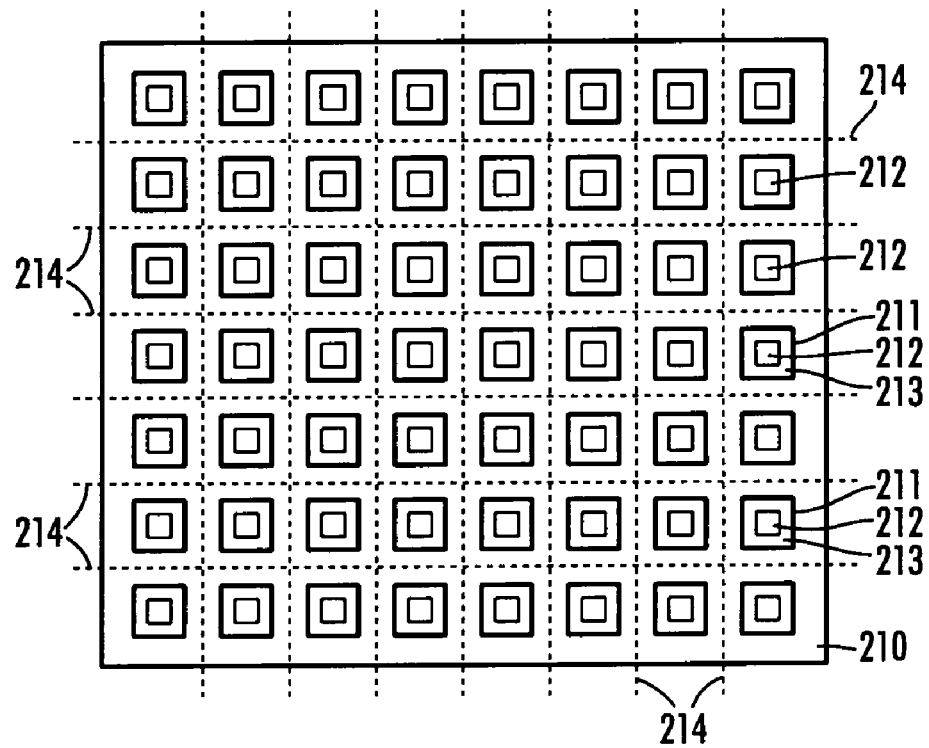
FIG. 20 is a top schematic view of an embodiment of the present invention.
Figure 21:
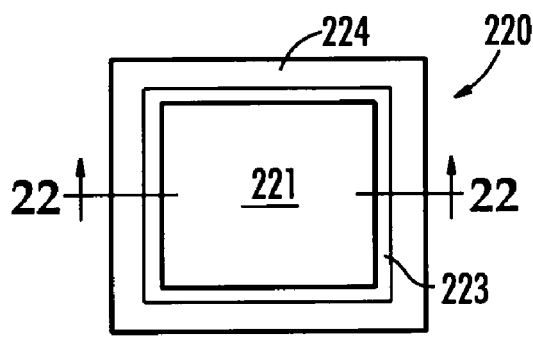
FIG. 21 is a bottom view of a capacitor formed by the invention.
Figure 22:
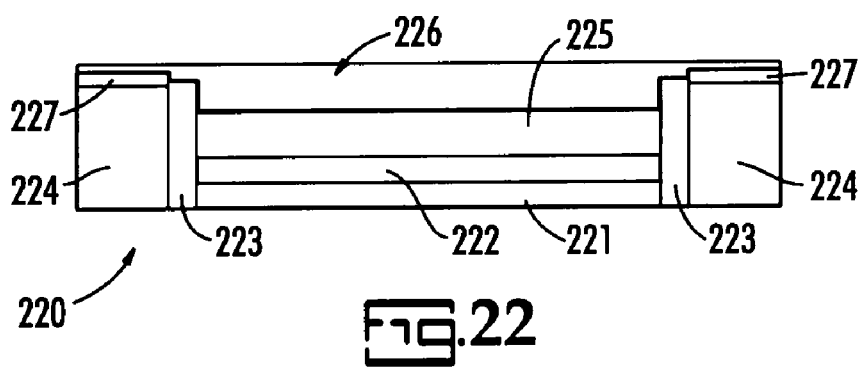
FIG. 22 is a cross-sectional schematic view taken along line 22-22 of FIG. 21.

A particularly preferred embodiment is illustrated in schematic top view in FIG. 21. In FIG. 20, the carrier, 210, has a multiplicity of pockets, 211. Each pocket has positioned therein a centrally located anode with an oxide coating thereon, 212. Between the anode and the walls of the pocket is an insulative material, 213. A cathode is deposited on the dielectric as described herein as is a preferable conductive layer electrically connecting the cathode to the carrier (not shown). After formation of the cathode, the carrier is preferably lap cut to expose the anode and dice cut along dice lines. The resulting capacitor is illustrated in bottom schematic view in FIG. 21 and schematic cross-sectional view in FIG. 22. In FIGS. 21 and 22 the anode has insulative material circumjacent thereto and the insulative material has the cathode circumjacent thereto.

In FIGS. 21 and 22 the capacitor, generally represented at 220, is particularly advantageous due to the absence of any rotational limitations in mounting. The capacitor comprises a centrally located anode, 221, with a dielectric, 222, thereon. An insulative material, 223, separates the anode and carrier, 224. A cathode, 225, is in electrical contact with the carrier through a conductive layer, 226, on the cathode and conductive coating, 227. The carrier forms a cathode connection around the exterior of the capacitor with an anode connection centrally located thereon with both on a common face.

Figure 23:
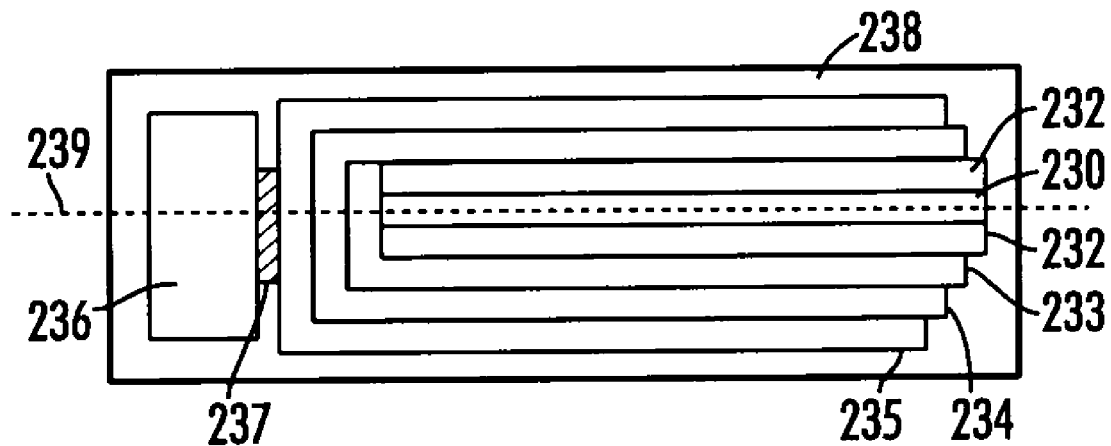
FIG. 23 is a cross-sectional view of an embodiment of the present invention illustrating a lap line.
Figure 24:
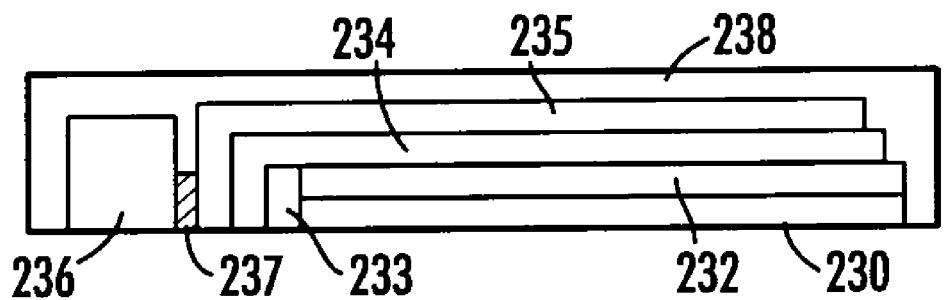
FIG. 24 is a cross-sectional view of the embodiment of FIG. 23 after further processing.

An alternate embodiment is illustrated in FIG. 23. In FIG. 23 a conductive foil, 230, comprising dielectric, 232, on each face, is coated on one face and an edge with an insulative material, 233. A cathode layer, 234, is then formed over the insulative material and dielectric. An optional, but preferred, conductive layer, 235, is coated on the cathode layer to form a capacitive element. The capacitive element is then secured to a conductive carrier bar, 236, with a conductive adhesive, 237, and the entire assembly is optionally encased in an encasement material, 238, which is not electrically conductive. The assembly is then lap cut along line 239 resulting in at least one capacitor having anode and cathode terminals on the same face as illustrated in cross-sectional view in FIG. 24.

The anode is a conductor preferably selected from a metal or a conductive metal oxide. More preferably the anode comprises a mixture, alloy or conductive oxide of a valve metal preferably selected from Al, W, Ta, Nb, Ti, Zr and Hf. Most preferably the anode comprises at least one material selected from the group consisting of Al, Nb and NbO. Conductive polymeric materials may be employed as an anode material. Particularly preferred conductive polymers include polypyrrole, polyaniline and polythiophene.

The cathode is a conductor preferably comprising at least one of manganese dioxide and a conductive polymeric material. Particularly preferred conductive polymers include polypyrrole, polyaniline and polythiophene. Metals can be employed as a cathode material with valve metals being less preferred. The cathode may include multiple layers wherein adhesion layers are employed to improved adhesion between the conductor and the termination. Particularly preferred adhesion layers include carbon, silver, copper, or another conductive material in a binder.

The dielectric is a non-conductive layer which is not particularly limited herein. The dielectric may be a metal oxide or a ceramic material. A particularly preferred dielectric is the oxide of a metal anode due to the simplicity of formation and ease of use.

The invention has been described with particular reference to the preferred embodiments without limit thereto. One of skill in the art would realize additional embodiments which are not specifically recited but within the scope of the claims appended hereto.

The invention claimed is:

1. A method for forming a capacitor comprising:
providing a carrier comprising a channel therein;
providing a conductive foil with a first dielectric on a first face of said conductive foil;
securing said conductive foil into said channel with said first dielectric away from a channel floor;
inserting an insulative material between said metal foil and each side wall of said channel;
forming a cathode layer on said first dielectric with said insulative material between said cathode and said side wall;
lap cutting said carrier parallel to said conductive foil such that said conductive foil is exposed; and
dice cutting to form at least one singulated capacitor.

2. The method for forming a capacitor of claim 1 further comprising forming a conductive layer on said cathode layer.

3. The method for forming a capacitor of claim 2 wherein said conductive layer is in electrical contact with said carrier.

4. The method for forming a capacitor of claim 1 further comprising at least partially encapsulating said carrier prior to said lap cutting and said dice cutting.

5. The method for forming a capacitor of claim 1 wherein said cathode layer is applied to said dielectric prior to said securing said conductive foil into said channel.

6. The method for forming a capacitor of claim 1 further comprising adding a singulation dam to said first dielectric.

7. The method for forming a capacitor of claim 6 wherein said cathode layer is between said insulative material and said singulation dam.

8. The method for forming a capacitor of claim 1 wherein said lap cutting is prior to said dice cutting.

9. The method for forming a capacitor of claim 1 wherein said dice cutting is within said insulative material.

10. The method for forming a capacitor of claim 1 wherein said dice cutting removes at least one said side wall from said capacitor.

11. The method for forming a capacitor of claim 1 wherein at least a part of said side wall remains on said capacitor.

12. The method for forming a capacitor of claim 1 further comprising at least one cross-cut channel.

13. The method for forming a capacitor of claim 1 wherein said conductive foil further comprises a second dielectric on a second face of said foil.

14. The method for forming a capacitor of claim 1 wherein said conductive foil comprises a metal.

15. The method for forming a capacitor of claim 1 wherein said conductive foil comprises a conductor or conductive oxide of a metal selected from Al, W, Ta, Nb, Ti, Zr and Hf.

16. The method for forming a capacitor of claim 15 wherein said conductive foil comprises at least one conductor selected from aluminum, tantalum, niobium, NbO and titanium.

17. The method for forming a capacitor of claim 1 wherein said dielectric is an oxide of said conductive foil.

18. The method for forming a capacitor of claim 1 wherein said conductive foil is aluminum.

19. The method for forming a capacitor of claim 1 further comprising applying a conductive layer on a top surface of said carrier.

20. The method for forming a capacitor of claim 19 further comprising forming a second conductive layer on said cathode layer and in electrical contact with said conductive layer.

21. The method for forming a capacitor of claim 1 wherein said carrier is conductive.

22. The method for forming a capacitor of claim 1 wherein said carrier comprises at least one metal selected from nickel, tin, copper, palladium, gold and lead.

23. The method for forming a capacitor of claim 1 wherein said cathode layer comprises manganese oxide or a conductive polymeric material.

24. The method for forming a capacitor of claim 23 wherein said conductive polymeric material is an intrinsically conducting polymer.

25. The method for forming a capacitor of claim 1 further comprising securing said conductive foil to a channel floor with an adhesive.

26. The method for forming a capacitor of claim 1 wherein said carrier comprises multiple channels.

27. The method for forming a capacitor of claim 1 wherein said capacitor has a single anode and multiple cathodes.

28. The method for forming a capacitor of claim 1 wherein said capacitor has a single cathode and multiple anodes.

29. The method for forming a capacitor of claim 1 wherein said capacitor is non-polar.

30. A method for forming a capacitor with coplanar terminals comprising:
providing a carrier comprising a channel therein;
providing a conductive foil comprising a conductor layer with a first dielectric on a first face of said metal layer;
securing said conductive foil into said channel with said first dielectric away from a channel floor;
inserting an insulative material between said conductive foil and each side wall of said channel;
forming a cathode layer on said first dielectric;
forming a conductive layer on said cathode layer and in electrical contact with said carrier;
lap cutting said carrier parallel to said conductor layer such that a surface of conductor of said conductor layer is exposed; and
dice cutting to form at least one singulated capacitor wherein said dice cutting is not in said insulative material.

31. The method for forming a capacitor with coplanar terminals of claim 30 further comprising at least partially encapsulating said carrier prior to said lap cutting and said dice cutting.

32. The method for forming a capacitor with coplanar terminals of claim 30 wherein said cathode layer is applied to said dielectric prior to securing said metal foil into said channel.

33. The method for forming a capacitor with coplanar terminals of claim 30 further comprising adding a singulation dam to said first dielectric.

34. The method for forming a capacitor with coplanar terminals of claim 30 wherein said lap cutting is prior to said dice cutting.

35. The method for forming a capacitor with coplanar terminals of claim 30 further comprising at least one cross-cut channel.

36. The method for forming a capacitor with coplanar terminals of claim 30 wherein said conductive foil comprises metal or a conductive metal oxide.

37. The method for forming a capacitor with coplanar terminals of claim 30 wherein said conductor layer comprises at least one conductor selected from Al, W, Ta, Nb, NbO, Ti, Zr and Hf.

38. The method for forming a capacitor with coplanar terminals of claim 37 wherein said conductor is aluminum.

39. The method for forming a capacitor with coplanar terminals of claim 30 wherein said dielectric is an oxide of said conductor layer.

40. The method for forming a capacitor with coplanar terminals of claim 30 further comprising applying a metal layer on a top surface of said carrier.

41. The method for forming a capacitor with coplanar terminals of claim 30 wherein said cathode layer comprises manganese dioxide or a conductive polymeric material.

42. The method for forming a capacitor with coplanar terminals of claim 41 wherein said conductive polymeric material is an intrinsically conducting polymer.

43. The method for forming a capacitor with coplanar terminals of claim 30 wherein said carrier comprises multiple channels.

44. The method for forming a capacitor with coplanar terminals of claim 30 wherein said capacitor is non-polar.

45. A method for forming a capacitor having terminals located opposing faces comprising:
providing a carrier comprising a channel therein;
providing a metal foil with a first dielectric on a first face of said metal foil;
securing said metal foil into said channel with said first dielectric away from a channel floor;
inserting an insulative material between said metal foil and each side wall of said channel;
forming a cathode layer on said first dielectric between said insulative material;
lap cutting said carrier parallel to said metal foil such that metal is exposed; and
dice cutting within said insulative material to form singulated capacitors.

46. The method for forming a capacitor having terminals located on opposing faces of claim 45 wherein said cathode layer is applied to said dielectric prior to securing said metal foil into said channel.

47. The method for forming a capacitor having terminals located on opposing faces of claim 45 further comprising adding a singulation dam to pattern said first dielectric.

48. The method for forming a capacitor having terminals located on opposing faces of claim 45 wherein said lap cutting is prior to said dice cutting.

49. The method for forming a capacitor having terminals located on opposing faces of claim 45 wherein said carrier comprises multiple channels.

50. The method for forming a capacitor having terminals located on opposing faces of claim 45 wherein said capacitor is non-polar.

51. A method for forming a capacitor comprising:
providing a carrier comprising a pocket therein;
providing a conductive foil;
forming a first dielectric on a first face of said conductive foil;
securing said conductive foil into said pocket with said first dielectric away from a pocket floor;
inserting an insulative material between said conductive foil and each side wall of said pocket;
forming a cathode layer on said first dielectric;
forming a conductive layer on said cathode layer and in electrical contact with said carrier;
lap cutting said carrier parallel to said conductive foil such that conductor is exposed; and
dice cutting to form singulated capacitors.

52. The method for forming a capacitor of claim 51 further comprising at least partially encapsulating said carrier prior to said lap cutting and said dice cutting.

53. The method for forming a capacitor of claim 51 further comprising adding a singulation dam to pattern said first dielectric.

54. The method for forming a capacitor of claim 53 wherein said cathode layer is between said insulative material and said singulation dam.

55. The method for forming a capacitor of claim 51 wherein said lap cutting is prior to said dice cutting.

56. The method for forming a capacitor of claim 51 wherein said dice cutting removes at least one said side wall from said capacitor.

57. The method for forming a capacitor of claim 51 wherein at least a part of said side wall remains on said capacitor.

58. The method for forming a capacitor of claim 51 wherein said conductive foil further comprises a second dielectric on a second face of said foil.

59. The method for forming a capacitor of claim 51 wherein said conductive foil comprises metal or a conductive metal oxide.

60. The method for forming a capacitor of claim 59 wherein said metal layer or conductive metal oxide comprises at least one conductor selected from Al, W, Ta, Nb, NbO, Ti, Zr and Hf.

61. The method for forming a capacitor of claim 60 wherein said conductor is aluminum.

62. The method for forming a capacitor of claim 51 wherein said dielectric is an oxide of said conductive foil.

63. The method for forming a capacitor of claim 51 further comprising applying a metal layer on a top surface of said carrier.

64. The method for forming a capacitor of claim 63 further comprising forming said conductive layer on said cathode layer and in electrical contact with said metal layer.

65. The method for forming a capacitor of claim 51 wherein said carrier is conductive.

66. The method for forming a capacitor of claim 51 wherein said carrier comprises at least one metal selected from nickel, tin, copper, palladium, gold and lead.

67. The method for forming a capacitor of claim 51 wherein said cathode layer comprises manganese dioxide or a conductive polymeric material.

68. The method for forming a capacitor of claim 67 wherein said conductive polymeric material is an intrinsically conducting polymer.

69. The method for forming a capacitor of claim 51 comprising securing said conductive foil to a pocket floor with an adhesive.

70. The method for forming a capacitor of claim 51 wherein said carrier comprises multiple pockets.

71. A method for forming a capacitor comprising:
providing a metal foil with a first edge and a dielectric on a first face;
applying an insulator to said first edge and to a second face of said metal foil opposite to said dielectric;
applying a conductive layer to said dielectric and said insulator;
attaching a metal strip to said conductive layer to form a capacitor precursor;
lap cutting said capacitor precursor parallel to said foil and through said foil and said metal strip thereby exposing said metal strip and said metal foil on a common face with an insulator therebetween.

72. The method for forming a capacitor of claim 71 wherein said metal foil further comprises a second dielectric on said second face.

73. The method for forming a capacitor of claim 72 further comprising encapsulating said capacitor precursor.

74. The method for forming a capacitor of claim 71 wherein said metal foil comprises metal or a conductive metal oxide.

75. The method for forming a capacitor of claim 74 wherein said metal foil comprises at least one conductor selected from Al, W, Ta, Nb, NbO, Ti, Zr and Hf.

76. The method for forming a capacitor of claim 75 wherein said conductor is aluminum.

* * * * *

UNITED STATES PATENT AND TRADEMARK OFFICE
CERTIFICATE OF CORRECTION

| | | |
|---|---|---|
| PATENT NO. | : 7,833,292 B2 | Page 1 of 1 |
| APPLICATION NO. | : 12/098593 | |
| DATED | : November 16, 2010 | |
| INVENTOR(S) | : Brenneman et al. | |

It is certified that error appears in the above-identified patent and that said Letters Patent is hereby corrected as shown below:

In (73) Assignee add the following:
Motorola, Inc., Schaumburg, Illinois

Signed and Sealed this
Fourteenth Day of June, 2011

David J. Kappos
*Director of the United States Patent and Trademark Office*